United States Patent [19]
Brubaker

[11] 3,792,790
[45] Feb. 19, 1974

[54] TRANSPORTABLE BULK-MATERIAL HANDLING APPARATUS

[75] Inventor: Louis M. Brubaker, Delphi, Ind.
[73] Assignee: Alloy Grafts Co., Delphi, Ind.
[22] Filed: Mar. 8, 1971
[21] Appl. No.: 122,033

[52] U.S. Cl. .............................. 214/501, 214/17 C
[51] Int. Cl. ........................................ B60p 1/04
[58] Field of Search............214/501, 508, 509, 16 R, 214/17 C; 198/48, 50, 55; 259/95, 97; 298/10, 17

[56] References Cited
UNITED STATES PATENTS

| | | | |
|---|---|---|---|
| 3,208,616 | 9/1965 | Haskins | 214/508 |
| 2,347,437 | 4/1944 | Saxe | 214/16 R |
| 2,342,528 | 2/1944 | Carbaugh | 214/16 R |
| 3,547,291 | 12/1970 | Batterton | 214/501 X |
| 3,313,435 | 4/1967 | Welk | 214/501 |
| 3,092,264 | 6/1963 | Milek | 214/501 X |
| 3,000,671 | 9/1961 | Monegato | 298/10 X |
| 3,559,830 | 2/1971 | Toppins | 214/508 |

Primary Examiner—Albert J. Makay
Attorney, Agent, or Firm—Joseph B. Gardner, Esq.

[57] ABSTRACT

Apparatus, transportable from one location to another, for handling bulk materials of granular or pulverulent consistency such as corn, and other grains, dry bulk chemicals, and the like. The apparatus includes a wheel-equipped carriage adapted to be towed from one location to another, and it further includes a large longitudinally-extending bin pivotally supported by the carriage for angular displacements between a generally vertical position of use and a generally horizontal position for transport. A tubular elevator shaft extends longitudinally through the bin and is equipped with a bucket conveyor adapted to carry material upwardly from the lower end to the upper end of the bin. The bin is essentially devoid of independent frame structure, and the bin and elevator shaft extending therethrough mutually reinforce and rigidify each other. The center of gravity of the bin is so related to the pivotal axis therefor that relatively constant-moment loads are operative on the bin irrespective of the position thereof tending to rotate it toward the horizontal position thereof.

6 Claims, 6 Drawing Figures

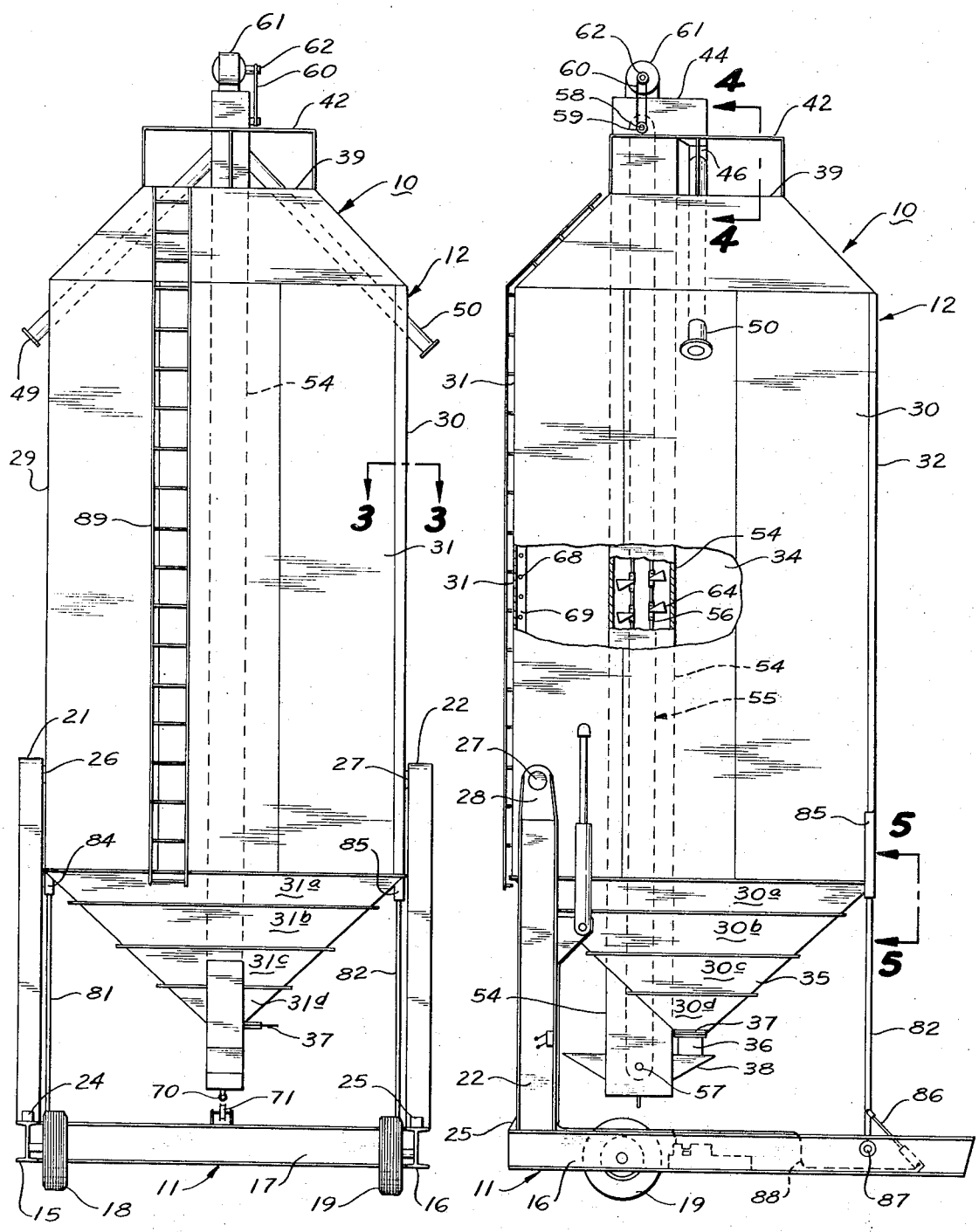
FIG. 1
FIG. 2
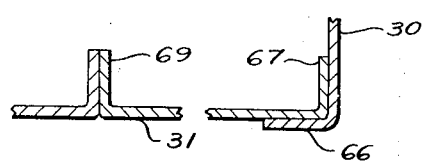
FIG. 3
INVENTOR:
LOUIS M. BRUBAKER
BY:
Joseph B. Gardner
ATTORNEY

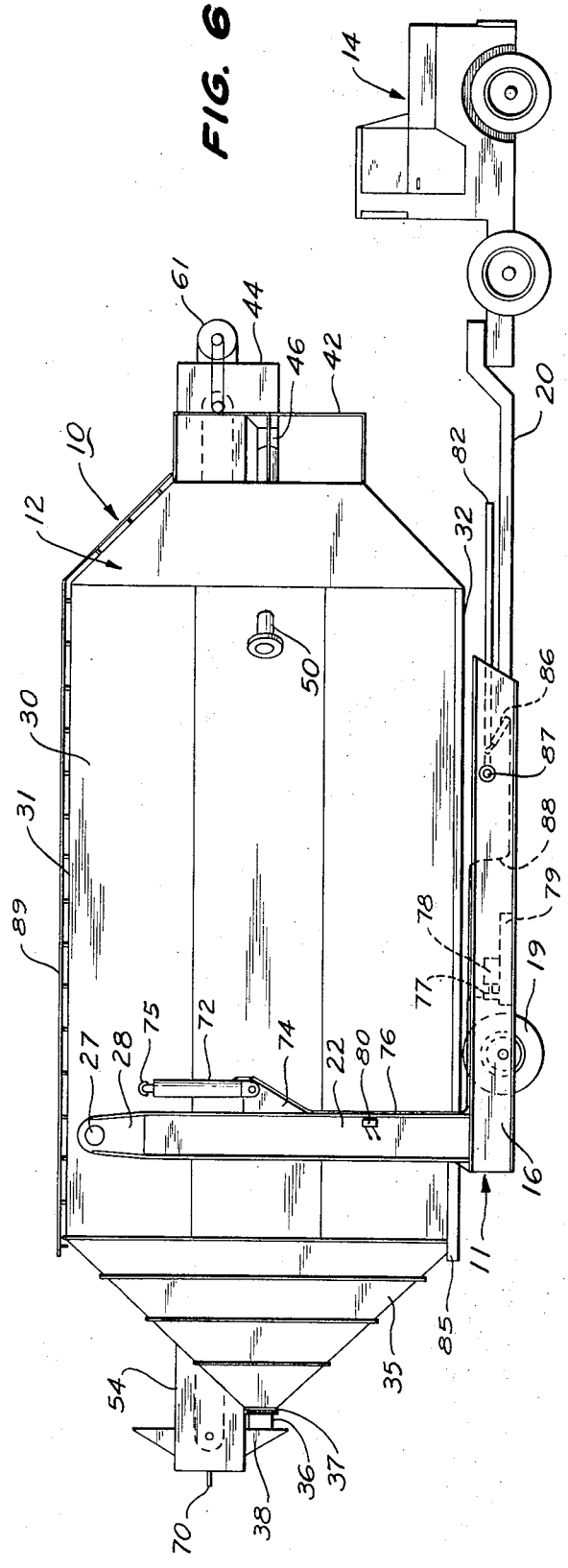
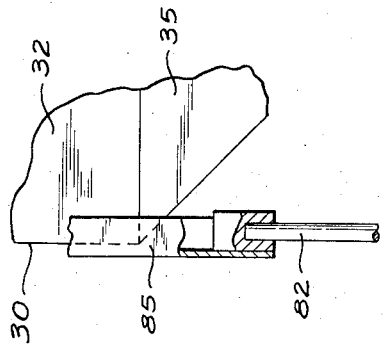
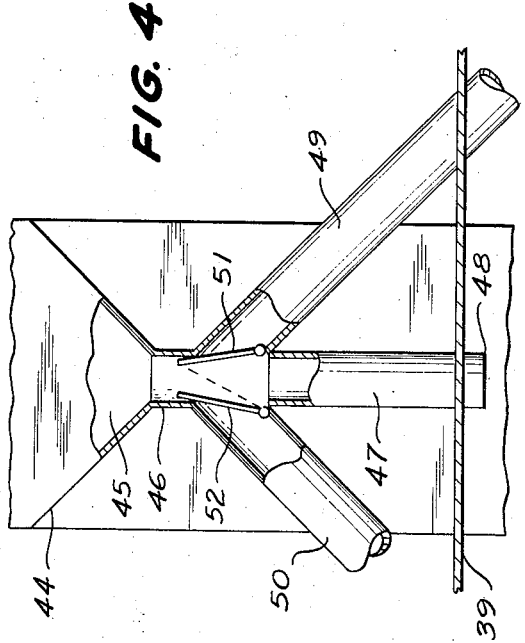
INVENTOR:
LOUIS M. BRUBAKER
BY: Joseph B. Gardner
ATTORNEY

TRANSPORTABLE BULK-MATERIAL HANDLING APPARATUS

This invention relates to apparatus for handling bulk materials such as corn, wheat, rice and other grains, dry bulk chemicals, and similar granular or pulverulent materials; and it relates more particularly to transportable bulk-material handling apparatus adapted to be moved conveniently from one location of use to another to be employed thereat as a receiver for such materials or as a high capacity portable elevator therefor.

Although there are a great number of environments in which the present invention has utility, a specific instance thereof is in handling grain, especially corn, which is a granular or pulverulent material often, although not necessarily, quite fluent. Considering the handling of corn, as an exemplary instance of the use of the apparatus, corn is usually harvested while somewhat wet and must be transported from the field to a central location at which it is held in relatively large storage containers for drying and other processing. Since the storage facilities are large, specialized, and therefore quite expensive, they are often quite remote from the harvest areas so that the harvested corn must be transported thereto which requires loading the corn into trailers or other conveyances and then unloading the corn therefrom at the elevator facility. The alternative, however, has heretofore been impracticable because the cost of providing fixed facilities for handling relatively large quantities of the grain has not been economically feasible.

Accordingly, an object of the present invention is to provide an improved bulk-material handling system for processing granular or pulverulent material such as grain and the like which is portable so that it can be transported from one location of use to another, which is inexpensive and is characterized by low-maintenance operation, and which is easy to use and reliable in its function.

Additional objects, among others, of the present invention are in the provision of a portable bulk-material handling apparatus having a carriage adapted to be towed or otherwise transported from one location to another and a bin of large capacity supported on the carriage for movement between a generally vertical position of use and a generally horizontal position for transport; which apparatus has an interrelated center of gravity and axis about which the bin is displaceable which provides relatively constant moment loads tending to bias the bin toward its horizontal position; which bin is substantially devoid of independent frame structure and includes a tubular elevator shaft extending longitudinally therethrough which, together with the bin, results in a mutuality of support by means of which the shaft tends to rigidify the bin and the bin to rigidity the shaft; and which apparatus includes: ready transportability so that it can be used in remote areas; easy displacement between the generally horizontal and generally vertical positions for transport and use, respectively; absence of a requirement for an independent foundation; waterproof characteristics for outdoor application; which provides variable speed loading and unloading as compared to a gravity system; which is capable of resisting wind loads and the application of eccentric forces thereto during loading which tend to tilt the same; which can off-load from either side of the bin at sufficient height to allow filling of relatively high receptacles, vehicular or otherwise, not associated with the apparatus; which is shaped and suspended for optimum length, width, height, and balance so that it is transportable both by highway and rail; which can be used as a holding or surge bin in a production line, can be used as a storage bin, and can be used as a portable grain elevator; and which has the economic advantages of being taxed, depreciated, and financed as portable equipment as well as being repossessible.

Additional objects and advantages of the invention, especially as concerns particular features and characteristics thereof, will become apparent as the specification continues.

An embodiment of the invention is illustrated in the accompanying drawings, in which:

FIG. 1 is an end view in elevation of apparatus embodying the invention;

FIG. 2 is a side view in elevation of the apparatus;

FIG. 3 is an enlarged broken transverse sectional view taken along the line 3—3 of FIG. 1;

FIG. 4 is an enlarged broken vertical sectional view taken along the line 4—4 of FIG 2;

FIG. 5 is an enlarged broken side view and elevation, partly in section, taken generally along the line 5—5 of FIG. 2; and FIG. 6 is a side view in elevation, similar to that of FIG. 2, but illustrating the apparatus in its horizontal position and connected to a vehicle preparatory to being transported to a different location.

The exemplary embodiment of the transportable bulk-material handling apparatus illustrated in the drawings is designated in its entirety with the numeral 10, and it comprises a carriage 11 and a bin 12. The carriage 11 supports the bin 12 in a manner permitting the bin to be angularly displaced between the upright or generally vertical position of use shown in FIGS. 1 and 2 and the generally horizontal position for transport illustrated in FIG. 6. Also, the carriage 11 is adapted to be connected to a vehicle such as a truck or tractor 14, as illustrated in FIG. 6, which is then able to transport the carriage and bin from one location of use to another.

The carriage 11 may take a variety of forms, but it advantageously requires no foundation, at least if used on level terrain, and is sufficiently strong and stable to support the bin 12 in its vertical orientation of use with the normally encountered wind loadings to which it may be subjected applied thereagainst and with adequate accommodation for limited tilting of the bin which may occur during loading thereof. The carriage 11 illustrated in the drawings is a simple, lightweight structure comprising a platform composed of transversely spaced and longitudinally extending side beams 15 and 16, and a plurality of longitudinally spaced and transversely extending cross beams 17 (only one of which is shown) welded or otherwise rigidly secured to the side beams. The platform components 15, 16, and 17 may have any usual structural configurations such as the I-beam configuration illustrated.

The platform of the carriage 11 is also equipped with a plurality of wheels, there being two such wheels in the embodiment illustrated which are respectively denoted with the numerals 18 and 19. The wheels are rotatably supported on conventional bearing and spindle assemblies so as to rollingly engage a roadway or other underlying surface to permit the carriage and bin 12 supported thereon to be transported from one location to another, as shown in FIG. 6. The wheels 18 and 19 are also removably attached to the carriage platform so that they can be removed with facility whenever the apparatus is to be used, thereby contributing by their absence to the stability of the apparatus. As illustrated in FIG. 6, the carriage 11 may be equipped with a tongue 20 bolted or otherwise removably secured to the platform to enable the carriage to be attached to a vehicle 14 for transport.

The carriage 11 also comprises support structure in the form of transversely spaced uprights or columns 21 and 22 welded or otherwise rigidly secured to the platform and, in particular, to the side rails 15 and 16 thereof. The uprights 21 and 22 may be I-beams as shown best in FIG. 6, and the interconnections thereof with the side beams 15 and 16 may be reinforced with buttress plates, such as the plates 24 and 25 respectively disposed adjacent the rear surfaces of the uprights 21 and 22.

The bin 12 is secured to the support structure comprising the uprights 21 and 22 for angular displacements with respect thereto and with respect to the entire carriage 11 between a generally vertical position of use, shown in FIGS. 1 and 2, and a generally horizontal position for transport, as illustrated in FIG. 6. In more particular terms, mounting means are provided for interconnecting the bin 12 and uprights 21 and 22 for such relative angular displacements therebetween, and the mounting means takes the form of pivot shafts and journal structures establishing a horizontally disposed axis adjacent the upper ends of the uprights 21 and 22 and about which the bin 12 is pivotally displaceable. For purposes of identification, the pivot shafts are respectively denoted with the numerals 26 and 27, and the journals therefor may be located either at the bin or at the uprights, whichever is most convenient in any particular embodiment of the apparatus. In the particular form shown, the journals are located in the uprights 21 and 22, the upper end portions of which are configurated for this purpose, as shown at 28 in FIGS. 2 and 6.

The bin 12 is an elongated, longitudinally extending structure having side walls 29 and 30, and end walls 31 and 32 defining a large chamber or material-receiving space 34 therewithin. At its lower end, the side end and end walls converge inwardly and downwardly to form a funnel-shaped bottom section 35 terminating in a spout 36 forming an outlet opening through which material within the chamber 34 is discharged. Flow of material through the outlet is controlled by suitable valve means which is advantageously a slide plate 37 selectively displaceable between an inner closed position and an outer open position. The spout 36 opens into a receiver 38 so as to discharge material thereinto for the advantageous purposes described hereinafter, but the spout can be connected directly to a flow conduit so as to permit material from the chamber 34 to be discharged directly thereinto.

At its upper end, the side and end walls of the bin 12 converge inwardly and upwardly to form a frustopyramidal upper section having a generally flat or planar top wall 39 equipped with outwardly projecting super structure in the form of a railing 42 comprising a plurality of vertically disposed posts or struts supporting a handrail in spaced, parallel relation with the top wall 39. Hopper structure 44, as shown best in FIG. 4, is associated with the bin 12 and it converges downwardly and inwardly to form a somewhat funnel-shaped collection space 45 in open communication with a distribution conduit 46 that connects with an inlet conduit 47 extending downwardly through the top wall 39 of the bin and defining an inlet opening 48 therewithin.

Also communicating with the conduit 46 adjacent the juncture thereof with the inlet conduit 47 are a plurality of delivery conduits 49 and 50 which diverge downwardly and outwardly, projecting through the top wall 39 of the bin and through the side walls 29 and 30 thereof, respectively, as shown best in FIG. 1. With this arrangement, material leaving the hopper 44 via the conduit 46 has a tripartite path through which it can flow including the inlet conduit 47 and delivery conduits 49 and 50. Valve means are provided to permit selective control over the path of movement of material leaving the hopper 44, and such valve means in the particular embodiment of the invention being considered includes a pair of flap valves 51 and 52 which are selectively movable between the generally vertical positions illustrated by full lines in FIG. 4 and inclined positions, as shown by broken lines associated with the valve 52 to depict its alternate position.

The valves 51 and 52 may be manually adjustable (although motor-driven valves can be used), and in the positions shown by full lines in FIG. 4, the delivery conduits 49 and 50 are closed so that all of the material leaving the hopper 44 will flow into the chamber 34 of the bin 12 via the conduits 46 and 47. If each of the valves 51 and 52 is moved inwardly into a centered orientation within the conduit 46, the inlet conduit 47 will be closed and each of the delivery conduits 49 and 50 open so that part of the material leaving the hopper 44 will flow into each of the delivery conduits, thereby providing two separate flow paths for such material. Whenever one of the valves is in its fully displaced inclined position and the other in the full-line position of FIG. 4, the inlet conduit 47 will be closed and one of the delivery conduits 49 or 50 open and the other closed so that all of the material leaving the hopper 44 will flow through the open delivery tube. Although it will be usual to have the valve 51 and 52 in their fully open or fully closed positions, they can be adjusted to partially open certain of the conduits 47, 49, and 50. Also, an additional valve can be incorporated in the inlet conduit 47 so as to enable all of the three discharge conduits to be closed, but there is little requirement for such an additional valve in the usual use of the apparatus. As shown in FIG. 1, the outer end portions of the delivery conduits 49 and 50 project freely from the bin 12 and side walls 29 and 30 thereof to permit connection of such conduits with flow tubes, chutes, etc. to transfer material from the delivery conduits to containers located exteriorly of the bin such as a railway car, truck trailer, storage bin, and the like.

Material is delivered to the hopper 44 by conveyor or elevator structure operative to transport such material upwardly from the receiver 38 to the hopper. The conveyor structure in the particular form of the invention being considered includes a hollow, tubular conveyor or elevator shaft 54 extending through the bin 12 from the top to bottom thereof so as to project outwardly therefrom, as shown clearly in FIGS. 1 and 2. Located within the shaft 54 is a conveyor or elevator 55 in the form of a conventional bucket elevator comprising transversely spaced endless belts 56 entrained at opposite ends about sheaves respectively supported on shafts 57 and 58, the first of which is an idler shaft and the second a drive shaft. The shafts 57 and 58 are journaled for rotation in bearing structures provided for this purpose along the walls of the shaft 54, and the drive shaft 58 is equipped with a sprocket or sheave 59 (depending upon the particular drive being employed) about which is entrained a drive belt 60 driven by a prime mover 61 via a drive sheave or sprocket 62. Ordinarily, the prime mover 61 will be an electric motor energized from a suitable source, but it may take other forms (a gasoline engine, for example) in instances in which electric power is not readily available.

Attached to the endless belts 56 at spaced apart intervals therealong so as to be carried thereby are a plurality of conveyor elements or buckets 64 which, as is well known, are configured and supported so as to scoop a quantity of material thereinto when passing through the receiver 38 and thereafter carry the material upwardly to the hopper 44 into which the material is dumped as the bucket traverses the arcuate path defined by the drive sheaves supported upon the shaft 58, and which arcuate path is illustrated by broken lines in FIG. 2. The belts 56 are relatively taut and usually require no support intermediate the ends of the conveyor to resist transverse or lateral loads. As respects the present invention, the elevator 55 may be a completely conventional bucket elevator functioning in the usual manner to pick up and carry granular or fluent-type material from a lower elevation to a higher elevation at the latter of which the material is dumped into a hopper or other container provided for this purpose.

It will be evident that the receiver 38 and elevator shaft 54 are in open communication adjacent the lower end of the shaft so that the elevator 55 passes through the receiver, and so that the elevator shaft is also in open communication at its upper end with the interior of the hopper 44. The prime mover 61 is supported upon the upper end of the hopper 44, but could be located elsewhere such as upon the top wall 39. Also, the prime mover could be either mounted at the lower end of the bin 12 or supported upon the carriage 11, although the latter positioning of the prime mover would require interruption of the driving connection thereof with a conveyor 55 whenever the bin 12 is displaced into the generally horizontal position thereof shown in FIG. 6.

The bin 12 is essentially devoid of independent frame structure, and for the most part comprises a plurality of sheet metal panels connected one to another wherever necessary or appropriate by rigidly interconnecting the adjacent edge portions of successive panels, which edge portions are turned laterally for this purpose and are disposed in contiguous abutment with surfaces of an adjacent panel so that they can be welded, riveted, or otherwise secured one to another. In this respect, FIG. 3 illustrates such interconnection of the side wall panels 30 and 31 adjacent a corner portion of the bin 12 and, as seen in this Figure, the end portions of the wall panels are turned laterally and are disposed in abutting juxtaposition with adjacent panel surfaces. For purposes of identification, the flanges at the adjacent ends of the wall panels 30 and 31 are respectively denoted with the numerals 66 and 67, and such flanges are fixedly secured to each other by any usual fastening technique which, in the particular bin being considered, comprises rivets 68 as shown in association with the flange 69 located intermediate the corners of the wall panel 31, as illustrated in FIG. 2. Respecting the flange 69, the side walls of the bin 12 are formed of a plurality of identical panels equipped with laterally turned end portions by means of which successive panels are joined. As shown in FIGS. 1, 2, and 6, each side wall may comprise (in a perimetric sense) three identical panels joined along longitudinal lines. The various flanges are advantageously turned inwardly so as to minimize the presence of external protuberances along the bin 12.

The flanges define integral reinforcing at the corner portions of the bin 12 where strength is best utilized, and the elevator shaft 54 (which is constructed in the same manner) extending through the interior of the bin 12 also reinforces and thereby strengthens the same. The lower end portion 35 of the bin is strengthened and rigidified by means of the construction shown in the drawings in which such end portion comprises a plurality of relatively narrow wall panels respectively denoted with the numerals 30a through 30d respecting side wall 30, and with the numerals 31a through 31d, respecting the end wall 31, and which panels along their transverse edges are turned outwardly and are fixedly secured to each other in the manner of the aforementioned flanges 66 and 67. The transverse edges of the various panel strips 30 and 31 are turned outwardly so that the inner surfaces of the funnel section 35 of the bin 12 are relatively smooth and do not interfere with the free downward movement of material therethrough. However, the inclined, converging edges of such panels at the ends thereof are turned inwardly and are secured to each other in the same manner as the flanges 66 and 67 since they extend along the path of the downward movement of material through the funnel section and do not, therefore, interfere with such movement of material.

There is no corresponding requirement for additional reinforcement along the upper end portion of the bin 12 since very little force is applied thereagainst as a consequence of material filling the bin. At the lower end portion 35, the weight loadings thereon can be quite large so that the strength-increasing construction shown and described is advantageous. By way of example, for purposes of indicating the order of magnitude of a typical apparatus 10, the overall height thereof may be of the order of 40 feet, it may be square-shaped in cross section and have an area of the order of 144 square feet (i.e., 12 feet square), and can be constructed of 12 guage steel sheet metal. Such apparatus has a tare weight of the order of 5,000 pounds, and will accommodate approximately 3,600 bushels of a granular material such as corn weighing approximately 200,000 pounds — the equivalent of four semitrailer loads of 50,000 pounds each. With the wheels 18 and 19 and hitch 20 removed, the ground loading will not exceed approximately 2,000 pounds per square foot.

The stresses attributable to weight loadings of the general order of magnitude indicated tend to be confined to the corner portions of the square-shaped bin 12 where the strength thereof is located, and this configuration of the bin increases the capacity thereof by more than 27 percent over a counterpart bin of cylindrical configuration having the same diameter as the length or width dimension of the bin 12. This maximization of the capacity or volume of the bin 12 is advantageous in association with the highway limits imposed on the dimensions of any vehicle traveling the same which is the case with the apparatus 10 when it is transported from one location to another. In apparatus having the general size stated, the elevator 55 is able to process approximately 4,500 bushels of material per hour when driven by an electric motor 61 of 5 horsepower.

The apparatus 10 includes means for use in determining the orientation of the bin 12 and contributive to moving the same between the generally vertical and horizontal positions respectively illustrated in FIGS. 2 and 6. The means employed in a simple form thereof may include a hook 70 adapted to have a cable attached thereto, and a pulley wheel 71 about which such cable (not shown) can be entrained. In use of such an arrangement, a cable of appropriate strength is passed under the pulley wheel 71 and at one end is attached to the eye or fastener 70 and at its other end adjacent the opposite end portion of the carrier 11, the cable is attached to a truck or tractor. It will be appreciated that when a tensile force is applied to the cable by such tractor, a force will be applied to the eye 70 tending to rotate the bin 12 in a counterclockwise direction, as viewed in FIGS. 2 and 6, thereby causing the bin to be erected or displaced angularly from the horizontal position shown in FIG. 6 into the upright position shown in FIG. 2, or, in an opposite sense, to permit the bin 12 to rotate downwardly into its horizontal position from the erect or upright position thereof shown in FIG. 2, provided that the force applied to the cable is of such value that it permits downward displacement of the bin.

In this latter respect, it may be observed that the pivot axis defined by the shafts 26 and 27 is offset transversely or laterally from the longitudinal axis of the bin 12 and, as viewed in FIG. 2, to the left thereof. As a result, the gravitational force operative upon the bin 12 applies a continuous moment of clockwise direction thereto biasing the bin toward its horizontal position. Accordingly, whereas a positive force must be applied to the bin 12 to erect the same (i.e., displace the bin angularly from its horizontal to its upright position), the bin will automatically return to its horizontal position so that the only force that must be applied to the bin during this operation is that of sufficient magnitude to yieldingly resist the gravitational force operative upon the bin. Either in the case of the bin 12 being erected or being returned to its horizontal position, appropriate force for this purpose can be applied to the bin via the eye 70 and appropriate cable attached thereto.

In the particular embodiment of the invention illustrated in the drawings and being described therein, means are incorporated therein for raising and lowering the bin 12 directly. Such means takes the form of a plurality of fluid motor means comprising hydraulic piston-cylinder structure 72 located in association with each of the uprights 21 and 22, although only one such piston-cylinder structure is shown in the drawings. The cylinder of each such structure 72 is pivotally secured to a bracket 74 welded or otherwise rigidly related to the associated upright. The rod of each such structure 72 is pivotally attached at 75 to the associated side wall of the bin 12. Whenever the piston-cylinder structures 72 are energized so as to displace the rods outwardly from the retracted positions thereof shown in FIG. 6, the resultant torque applied to the bin 12 displaces the same angularly about the pivotal axis formed by the shafts 26 and 27 so as to force the bin into its upright position. Conversely, when the magnitude of the energizing force applied to the structures 72 is gradually decreased, the bin 12 is permitted to return in a clockwise direction into the generally horizontal position for transport shown in FIG. 6.

The structures 72 shown are hydraulically energized via a circuit that includes flow conduit means 76 connecting the cylinders 72 with a hydraulic pump 77 driven by a prime mover 78 in the form of an electric motor. The usual reservoir 79 is associated with the pump 77, and a suitable manually operable control 80 forming a part of the hydraulic circuit is conveniently located for manual manipulation.

Since the bin 12 is gravity biased toward the horizontal position thereof, locking means are included in the apparatus for fixedly maintaining the bin in its upright position. Although various arrangements may be used for this purpose, the particular apparatus 10 includes a pair of columns in the form of rods or posts 81 and 82 each of which is pivotally secured at its lower end to the associated side beams 15 and 16. At their upper ends, the posts 81 and 82 are respectively adapted to seat within the recess-equipped lower ends of socket members 84 and 85 which are rigidly attached to the bin 12. For this purpose, the socket members 84 and 85 may include recessed plugs welded or otherwise attached to the lower ends of L-shaped angle irons welded to the respectively associated side walls 29 and 30 of the bin 12 adjacent corner portions thereof. When the upper end portions of the rods 81 and 82 are engaging the socket members, the rods have an essentially vertical orientation so as to minimize flexure or bending moments therealong. The rods 81 and 82 are displaceable (mechanically in the form shown, but manual arrangements can be used) between the upright and retracted positions respectively shown in FIGS. 2 and 6, and motor means in the form of hydraulic piston-cylinder structures 86 (one of which is shown) are included for this purpose. Each such motor means 86 is pivotally connected at one end to the associated side beam of the carriage 11 and at its other end to the associated rod to accommodate the angular displacements of the latter about the pivotal supports therefor, as noted by the numeral 87 in FIGS. 2 and 6. The same motor driven pump 77 may be used to energize the motor means 86, and a circuit therefor is indicated by the flow conduit 88 which includes therein manually operable control means located at the same position as the aforementioned control means 80.

The center of gravity of the bin 12 is disposed generally along a longitudinal center plane through the bin which, therefore, locates it inwardly from the pivot axis or toward the right thereof, as viewed in FIG. 2. Further, the center of gravity remains at substantially the same location with respect to the pivot axis, and is therefore essentially spatially fixed relatively to the carriage 11 and uprights 21 and 22 thereof. As a result, relatively constant-moment loads are operative on the bin 12 tending to displace it into the generally horizontal position thereof irrespective of the position of the bin at any particular instant. That is to say, irrespective of whether the bin 12 is in its vertical orientation, horizontal orientation, or some intermediate position, the direction and magnitude of the moments summed about the pivot axis defined by the shafts 26 and 27 remain relatively constant. In structural terms, the uprights 21 and 22 comprise transversely spaced components extending to an elevation approximating the lateral width (i.e., the vertical dimension of the bin 12 as it is shown in FIG. 6, and the dimension thereof from left to right as it is shown in FIG. 2) of the bin which is secured adjacent a longitudinal edge portion thereof to the components at such elevation.

A ladder 89 may be attached to the bin 12 to permit workmen to ascend to the top thereof when it is in its erected position of use shown in FIGS. 1 and 2 for manipulating the valves 51 and 52 and for any other appropriate purposes. The ladder 89 is advantageously maintained as close as possible to the exterior walls of the bin 12 so as to occupy very little space, and in the orientation shown it does not in any way interfere with use of the bin.

The tubular elevator shaft 54 is constructed in the same manner as the bin 12 and, accordingly, it may have a polygonal cross sectional configuration (square-shaped, for example) with the edges of the wall panels turned laterally and rigidly secured to each other, as shown in FIG. 3 with respect to the corner portions of the bin 12. Thus, the elevator shaft 54 comprises integral frame structure that rigidifies the same and also, therefore, strengthens and rigidifies the entire bin 12 which, in turn does the same for the shaft.

Use of the apparatus will be evident from the foregoing discussion, and it will be appreciated that it is readily transported from one place of use to another which tremendously enhances its general utility and enables it to have great versatility in use. Since the apparatus is relatively lightweight, substantially any convenient work-type vehicle 14 can be used to pull or transport the apparatus so that special equipment is not required for this purpose. The tongue 20 and wheels 18 and 19 are readily removed prior to the bin being erected, so that the carriage 11 defines a stable, firm support for the apparatus during use thereof. It may be observed by comparing FIGS. 2 and 6 that the lower extremities of the bin 12 are at a much higher elevation relative to the carriage 11 and ground surface supporting the same when the bin is in its vertical position than when in the horizontal position thereof. This change in elevation provides the apparatus with a relatively low profile and center of gravity as it is being transported, thereby causing it to have considerable stability during transport and enabling it to move under relatively low obstructions. On the other hand, the increased spacing provided during use increases the facility with which the appropriate connections and manipulations associated with the lower end portion of the bin 12 may be made. In the typical embodiment of the invention heretofore considered, the change in elevation may be as great as 8 inches or more.

As heretofore indicated, when once loaded the material within the chamber 34 of the bin 12 can be continuously changed, turned, or mixed automatically by operation of the elevator 55 which will remove successive lowermost quantities of material from the chamber, carry such material to the hopper 44, and discharge the material thereinto where it becomes the uppermost quantity of material within the chamber. The apparatus may also be used directly as a load out device by means of which material placed in the receiver 38 is carried therefrom into the hopper 44 from which it is discharged downwardly and directly into exterior vehicular or other containers via one or both of the delivery conduits 49 and 50. Also, material stored within the chamber 34 can be off-loaded therefrom in the same manner. Alternatively, material placed within the receiver 38 can be loaded into the chamber 34 of the bin by the elevator 55 via the hopper 44 and feed conduit 47. The bin 12 is, accordingly, susceptible of variable speed loading and unloading by means of the elevator 55, although it can be unloaded by gravity through the bottom of the bin without use of the elevator 55.

The apparatus 10 is especially adaptable to material-mixing applications in which several materials having different characteristics are blended with one another such as is often required in preparing fertilizer mixers, chemical compositions, food products, etc. In such instances, the bin 12 can be sub-divided into a plurality of compartments filled through a distributor head (e.g., a plurality of valve-controlled delivery conduits 49,50 respectively connected therewith) and emptied through metering valves.

The bin 12 is ordinarily intended to be displaced between the vertical and horizontal positions thereof when empty, and to be transported in the same condition. However, whether loaded displacements and transport are feasible depends upon the weight of any particular material related to the structural strength of any particular bin. Also as respects its structural composition, it will be appreciated that making the bin at least in part from essentially identical panels simplifies fabrication and significantly reduces its cost.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. Transportable apparatus for handling bulk materials such as grain or the like, comprising a carriage adapted to be transported from location to location and equipped with support structure, an elongated bin defining a chamber therein having inlet and outlet openings respectively located at opposite end portions thereof and through which such material is admitted into and removed from said chamber, said support structure having transversely spaced upright components extending upwardly from said carriage to an elevation of the order of the approximate lateral width of said bin and said bin being disposed therebetween, mounting means securing said bin adjacent a longitudinal edge portion thereof to said spaced components at such elevation approximating the lateral width of said bin for angular displacements with respect to said carriage and spaced components between a generally vertical position for use and a generally horizontal position for transport, means adapted for use in controlling displacement of said bin between the generally vertical and generally horizontal positions thereof, an end portion of said bin being movable along an arcuate path intermediate said spaced components as said bin is displaced between the generally vertical and horizontal positions thereof, said mounting means including shaft and journal structure pivotally connecting said bin and spaced components at a location along the longitudinal edge portion of the bin so as to be offset from a longitudinal center plane therethrough and the center of gravity of said bin being generally along such center plane whereby said bin is gravity biased continuously toward the horizontal position thereof, said shaft and journal structure further being located with respect to said bin so that the center of gravity thereof remains generally at the same spatial location relative to said carriage and spaced components irrespective of the position of said bin, and further comprising means for locking said bin in the vertical position thereof.

2. The apparatus of claim 1 in which said transversely spaced components include a pair of transversely spaced uprights secured to said carriage adjacent an end thereof, the longitudinal edge portion of said bin along which said mounting means is secured thereto being oriented so that the major portion of said bin is disposed above said carriage in both the generally vertical and horizontal positions of the bin.

3. Transportable apparatus for handling bulk materials such as grain or the like, comprising a carriage adapted to be transported from location to location and equipped with support structure, an elongated bin defining a chamber therein having inlet and outlet openings respectively located at opposite end portions thereof and through which such material is admitted into and removed from said chamber, mounting means securing said bin to said support structure for angular displacements with respect to said carriage between a generally vertical position for use and a generally horizontal position for transport, means adapted for use in controlling displacement of said bin between the generally vertical and generally horizontal positions thereof, said bin being essentially devoid of independent frame structure lending mechanical support thereto, said bin being of polygonal cross section and comprising generally planar side wall panels equipped with laterally extending integral flanges adjacent the corners of said bin rigidly secured to adjacent panels and defining structural support adjacent the corner portions of said bin, a longitudinally disposed tubular elevator shaft extending through said chamber and being fixedly secured to said bin adjacent the opposite end portions thereof, an elevator located within said elevator shaft to transport material from one end to the other thereof, said elevator shaft being effective to reinforce said bin, said support structure including a pair of spaced apart uprights having said bin disposed therebetween, said mounting means including shaft and journal structure pivotally connecting said bin and uprights at a location such that a connection with said bin is offset from a longitudinal center plane therethrough, the center of gravity of said bin being generally along such center plane whereby said bin is gravity biased continuously toward the horizontal position thereof and said shaft and journal structure further being located with respect to such bin so that its center of gravity remains at generally the same spatial location relative to said carriage and uprights irrespective of the position of said bin, and means for locking said bin in the vertical position thereof.

4. The apparatus of claim 3 in which said means for use in controlling displacement of said bin includes means for attaching a cable thereto, and guide means mounted upon said carriage and about which such cable is adapted to be entrained.

5. The apparatus of claim 3 in which said means for controlling displacement of said bin includes hydraulic motor means connected with said carriage and bin and operative therebetween to displace said bin upwardly into its generally vertical position against the gravitational biasing force tending to displace said bin into the generally horizontal position thereof.

6. The apparatus of claim 3 in which said elevator comprises a bucket elevator operative to transport material from the lower to the upper end of said bin, drive means for said conveyor to actuate the same and effect such transportation of material, a receiver adjacent the lower end of said elevator shaft in open communication with said elevator, said receiver being connected with said bin adjacent the lower end thereof to receive material therefrom and also being provided with cover-equipped opening to receive material from a source exterior of said bin, valve means interposed between said receiver and bin to provide selective control over the delivery of material from said bin to said receiver, a hopper adjacent the upper end of said shaft in open communication with said elevator shaft in open communication elevator, said hopper being connected with said bin adjacent the upper end thereof through said inlet opening to deliver material thereto, a delivery tube connected adjacent one end thereof with said hopper and extending downwardly and outwardly therefrom to the exterior of said bin to deliver material to an external container, and distribution valve means for establishing selective communication with either said delivery tube or said inlet opening and hopper to determine the flow path followed by material discharged into said hopper by said elevator.

* * * * *